United States Patent
Cho et al.

(10) Patent No.: US 8,960,180 B2
(45) Date of Patent: Feb. 24, 2015

(54) SOLAR CELL CLEANING DEVICE OF AN ENERGY STORAGE SYSTEM AND METHOD OF CLEANING THE SOLAR CELL

(75) Inventors: Sungchun Cho, Suwon-si (KR); Suyong Chae, Suwon-si (KR); Jongki Choi, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1254 days.

(21) Appl. No.: 12/818,277

(22) Filed: Jun. 18, 2010

(65) Prior Publication Data
US 2011/0146660 A1    Jun. 23, 2011

(30) Foreign Application Priority Data
Dec. 22, 2009 (KR) .................. 10-2009-0128875

(51) Int. Cl.
| | |
|---|---|
| *F24J 2/00* | (2014.01) |
| *B08B 1/02* | (2006.01) |
| *H01L 31/042* | (2014.01) |
| *F24J 2/40* | (2006.01) |
| *F24J 2/46* | (2006.01) |

(52) U.S. Cl.
CPC ............... *B08B 1/02* (2013.01); *H01L 31/042* (2013.01); *F24J 2/40* (2013.01); *F24J 2/461* (2013.01); *Y02E 10/40* (2013.01); *Y02E 10/50* (2013.01)
USPC ............... 126/569; 126/111; 126/4; 136/206; 136/4; 134/56 R; 134/6

(58) Field of Classification Search
USPC .................. 126/569, 111, 4; 136/206, 243, 6; 134/56 R, 6
See application file for complete search history.

(56) References Cited

U.S. PATENT DOCUMENTS

| | | | | |
|---|---|---|---|---|
| 4,133,697 | A * | 1/1979 | Frosch et al. .................. | 136/245 |
| 2004/0123880 | A1 * | 7/2004 | Chiles et al. ............... | 134/22.18 |
| 2009/0241994 | A1 | 10/2009 | Lee | |
| 2011/0094549 | A1 * | 4/2011 | Lin ............................. | 134/198 |
| 2012/0311799 | A1 * | 12/2012 | Jaeger ................. | 15/4 |
| 2013/0306106 | A1 * | 11/2013 | Meller et al. ..................... | 134/6 |

FOREIGN PATENT DOCUMENTS

| | | | | |
|---|---|---|---|---|
| CN | 203253677 U | * 10/2013 | ............... | B08B 5/02 |
| JP | 11-054779 | 2/1999 | | |
| JP | 3085803 U | 5/2002 | | |
| JP | 2010161144 A | * 7/2010 | ........... | H01L 31/042 |
| KR | 10-2009-0062117 A | 6/2009 | | |
| WO | WO 2004091816 A1 | * 4/2004 | ............... | B08B 1/04 |

* cited by examiner

*Primary Examiner* — Steven B McAllister
*Assistant Examiner* — Nikhil Mashruwala
(74) *Attorney, Agent, or Firm* — Christie, Parker & Hale, LLP

(57) ABSTRACT

A solar cell cleaning device of an energy storage system, and a method of cleaning solar cells. Solar cells are positioned outside of a protective case only when sunlight is present. The surface of the solar cells is automatically cleaned when the solar cells are positioned outside of a protective case, or when the solar cells are stored in the protective case. The solar cell cleaning device includes a protective case, a rotatable drum coupled to the protective case, and a brush installed on the protective case and closely contacting the drum. A plurality of solar cells are installed on a surface of the drum, and are cleaned by the brush when the drum is rotated.

8 Claims, 8 Drawing Sheets

SOLAR CELL CLEANING DEVICE OF AN ENERGY STORAGE SYSTEM AND METHOD OF CLEANING THE SOLAR CELL

CROSS-REFERENCE TO RELATED APPLICATION

This application claims the benefit of Korean Application No. 10-2009-0128875, filed Dec. 22, 2009, in the Korean Intellectual Property Office, the disclosure of which is incorporated herein by reference.

BACKGROUND

1. Field

Embodiments relate to a solar cell cleaning device of an energy storage system, and a method of cleaning a solar cell.

2. Description of the Related Art

In general, photovoltaic power generation generates electricity by collecting sunlight into a solar cell or a photovoltaic module. Such a photovoltaic module is configured by a plurality of solar cell arrays, and is also referred to as a solar module. Photovoltaic modules are classified into general-type photovoltaic modules, window-type photovoltaic modules, tracking-type photovoltaic modules, and hybrid-type photovoltaic modules (combined with another energy power generation system). The principle of photovoltaic using such photovoltaic modules is performed by the photovoltaic effect. When a silicon crystal is doped with p-type impurities and n-type impurities, and sunlight is irradiated on a p-n junction solar cell, solar energy generates electromotive force through electrons and holes, which is called the photovoltaic effect. A predetermined number of solar cells may be connected in series and parallel to obtain a desired amount of electric power. In this case, the electric power may be stored in a battery and used when it is needed, by a system that is called an individual photovoltaic power generation system or an independent photovoltaic power generation system. When the individual or independent photovoltaic power generation system is linked with a typical power line, the system is referred to as a systematic linker-type photovoltaic power generation system. Specifically, a direct current electric source stored in the battery is converted into an alternating current electric source through an inverter, and supplied to an electric power consuming device such as an electric lamp.

In general, a solar cell panel is installed in the sunshine to generate photovoltaic power. However, a large amount of dust in air may attach to the solar cell panel, and moisture firmly fixes the dust to the surface of the solar cell panel. Thus, the collection of sunlight may be shielded and the sunlight may be scattered by the fixed dust, so that sunlight collecting efficiency may be degraded.

SUMMARY

Embodiments are directed to a solar cell cleaning device of an energy storage system, and a method of cleaning a solar cell, which substantially overcomes one or more of the problems due to the limitations and disadvantages of the related art.

It is therefore a feature of an embodiment to provide a solar cell cleaning device of an energy storage system, and a method of cleaning a solar cell, which protects the solar cells using a protective case and exposes the solar cells by moving them out of the protective case only when sunlight is present, and thus, the solar cells are protected from snow, rain, dew, dew condensation, and other foreign substances.

It is therefore a feature of another embodiment to provide a solar cell cleaning device of an energy storage system, and a method of cleaning solar cells which automatically cleans the surface of solar cells when the solar cells are exposed, or when the solar cells are stored in the protective case, so as to prevent the degradation of light collection efficiency of the solar cells.

At least one of the above and/or other features and advantages may be realized by providing a solar cell cleaning device of an energy storage system, the solar cell cleaning device including: a protective case; a rotatable drum coupled to the protective case; and a brush installed on the protective case near the drum, wherein a plurality of solar cells are installed on a surface of the drum, and are cleaned by the brush when the drum is rotated.

According to another embodiment, a sunlight sensor may be installed on the drum, wherein, when an intensity of sunlight sensed by the sunlight sensor is equal to or greater than a reference value, the drum is rotated along a preset angle to expose the solar cells out of the protective case, and when an intensity of sunlight sensed by the sunlight sensor is less than the reference value, the drum is rotated along a preset angle to store the solar cells in the protective case.

According to another embodiment, the solar cells may be disposed at least in a range from about 90° to about 180° along the surface of the drum.

A water injection nozzle may be installed on the protective case and be parallel to the brush.

According to another embodiment, a pump may be installed on the water injection nozzle to supply water, and a valve may be installed between the pump and the water injection nozzle.

The protective case may have a semi-cylindrical shape with an upper portion being cut, and the brush may include a first brush installed at an end of the protective case, and a second brush installed at another end of the protective case.

According to another embodiment, the solar cell cleaning device may further include a first water injection nozzle parallel to the first brush, and a second water injection nozzle parallel to the second brush.

The brush may rotate in a direction identical to a rotation direction of the drum or in a direction opposite to the rotation direction of the drum.

According to another embodiment, the drum may include a rotation shaft coupled to the protective case, and the rotation shaft may be coupled to a driving motor, and be rotated.

An encoder may be installed on the driving motor, and a rotation angle of the drum may be controlled by the encoder.

The solar cell cleaning devices may be provided, and the solar cell cleaning devices may be arrayed in a single line.

At least one of the above and/or other features and advantages may be realized by providing a method of cleaning a solar cell of an energy storage system, the method including: determining whether an intensity of sunlight is greater than an intensity of reference light; operating, when the intensity of the sunlight is greater than the intensity of the reference light, a driving motor to rotate a drum on which the solar cell is installed, so that the solar cell is exposed out of a protective case, and the solar cell is cleaned by a first brush; determining whether a rotation angle of the drum is a first preset angle; and stopping the driving motor when the rotation angle of the drum is the first angle.

The operating of the driving motor may include operating a water supplying pump, and opening a first valve such that a first water injection nozzle injects water to the solar cell.

The stopping of the driving motor may include stopping the water supplying pump, and closing the first valve.

According to another embodiment, the method may further include, after the stopping of the driving motor, determining whether an intensity of sunlight is greater than the intensity of the reference light; operating, when the intensity of the sunlight is less than the intensity of the reference light, the driving motor to rotate the drum on which the solar cell is installed, so that the solar cell is stored in the protective case, and the solar cell is cleaned by a second brush; determining whether a rotation angle of the drum is a second preset angle; and stopping the driving motor when the rotation angle of the drum is the second angle.

The operating of the driving motor when the intensity of the sunlight is less than the intensity of the reference light may include operating a water supplying pump, and opening a second valve such that a second water injection nozzle injects water to the solar cell.

The stopping of the driving motor when the rotation angle of the drum is the second angle may include stopping the water supplying pump, and closing the second valve.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
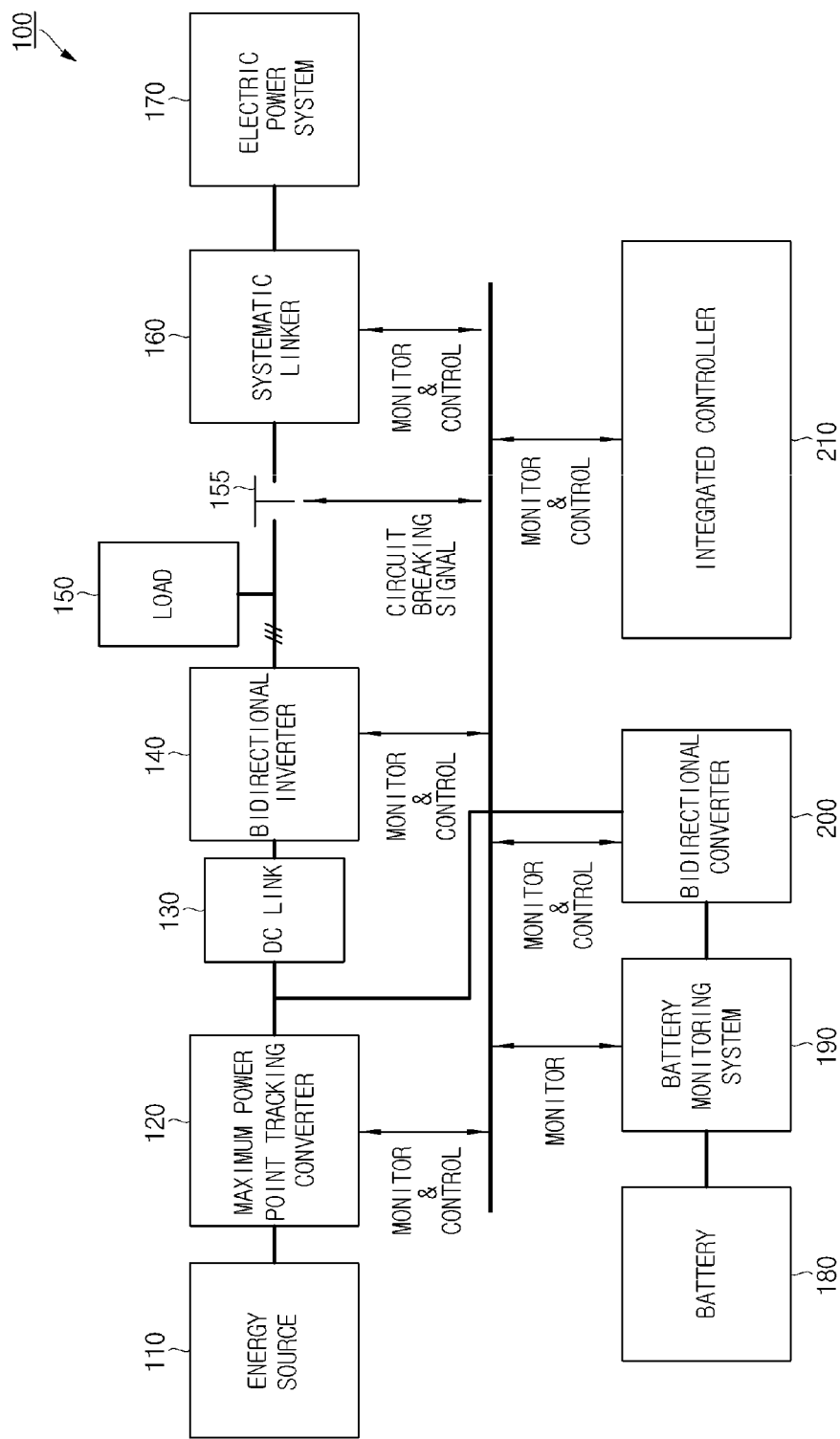
FIG. 1 is a block diagram illustrating an energy storage system according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals denote like elements throughout.

Hereinafter, embodiments will be described in detail with reference to the accompanying drawings.

FIG. 1 is a block diagram illustrating an energy storage system according to an embodiment. Referring to FIG. 1, an energy storage system 100 includes an energy source 110, a maximum power point tracking converter 120, a direct current (DC) link 130, a bidirectional inverter 140, a load 150, a systematic linker 160, an electric power system 170, a battery 180, a battery monitoring system 190, a bidirectional converter 200, and an integrated controller 210.

The energy source 110 includes sunlight, wind, water, and geothermal energy. In more detail, the energy source 110 may include electrical energy obtained from solar cells, wind power generators, and equivalents thereof. Hereinafter, solar cells are exemplified as devices to generate the energy source 110.

The maximum power point tracking converter 120 extracts the maximum electric power from the energy source 110, converts the maximum electric power into a direct current electric source at another level, and outputs the source. For example, the output of a solar cell is varied non-linearly according to amounts of solar radiation and surface temperatures of the solar cell. This degrades the generating efficiency of the solar cell. The maximum power point tracking converter 120 maintains an operation point of the solar cell, varied non-linearly according to amounts of solar radiation and surface temperatures of the solar cell, at the maximum operation point all the time. Furthermore, a direct current electric source extracted from the maximum power point is converted into a direct current electric source at another level, and then, provided to the DC link 130.

The DC link 130 temporarily stores a direct current voltage provided from the maximum power point tracking converter 120. The DC link 130 may be substantially a large capacity capacitor. Thus, the DC link 130 removes an alternating current component from a direct current electric source output from the maximum power point tracking converter 120, so as to store a stable direct current electric source. The DC link 130 also stabilizes and temporarily stores a direct current voltage provided from the bidirectional inverter 140 or the bidirectional converter 200 that will be described later. The bidirectional inverter 140 converts a direct current electric source provided from the DC link 130 into a common alternating current electric source and outputs the common alternating current electric source. Substantially, the bidirectional inverter 140 converts a direct current voltage from the energy source 105 or the battery 180 into a common alternating current voltage that can be used in a home, for example, and outputs the common alternating current voltage. In addition, the bidirectional inverter 140 converts a common alternating current electric source provided from the electric power system 170 into a direct current electric source, and provides the direct current electric source to the DC link 130. As a matter of course, an electric source stored in the DC link 130 is provided to the battery 180 through the bidirectional converter 200.

The load 150 may be a home or industry facility using a common alternating current voltage. The load 150 receives a common alternating current electric source from the energy source 105, the battery 180, or the electric power system 170.

The systematic linker 160 connects the bidirectional inverter 140 to the electric power system 170. For example, the systematic linker 160 adjusts a voltage variation range, prevents harmonics, and removes a direct current component, so as to provide an alternating current electric source of the bidirectional inverter 140 to the electric power system 170, or to provide an alternating current electric source of the electric power system 170 to the bidirectional inverter 140.

The electric power system 170 is an alternating current electric source system provided by an electric power company or an electricity generation company. For example, the electric power system 170 is an electric linker disposed within a wide range including a power plant, a substation, and power lines. The electric power system 170 may be referred to as a grid.

The battery 180 may be a secondary battery that is rechargeable. For example, the battery 180 may be a lithium ion battery, a lithium polymer battery, or an equivalent thereof, but an aspect of the present disclosure is not limited thereto.

The battery monitoring system 190 optimally maintains and controls the condition of the battery 180. For example, the battery monitoring system 190 monitors the voltage, current and temperature of the battery 180, and gives a caution for the abnormal state of the battery 180 to a user. In addition, the battery monitoring system 190 calculates state of charge (SOC) and state of health (SOH) of the battery 180, performs a cell balancing operation to equalize voltages or capacities of batteries, and controls a cooling fan (not shown) for preventing overheating of the battery 180.

The bidirectional converter 200 converts a direct current electric source output from the DC link 130 into a direct current electric source at another level adapted for the battery 180. In addition, the bidirectional converter 200 converts a direct current electric source of the battery 180 into a direct current electric source at another level adapted for the DC link 130. The bidirectional converter 200 may have a single structure, and be a non-insulating type or insulating type converter.

The integrated controller 210 observes and controls the maximum power point tracking converter 120, the bidirectional inverter 140, the systematic linker 160, and the bidirectional converter 200. In addition, the integrated controller 210 communicates with the battery monitoring system 190 to observe the battery monitoring system 190. Substantially, the integrated controller 210 senses the voltage, current, and temperature of the maximum power point tracking converter 120, the bidirectional inverter 140, the systematic linker 160, and the bidirectional converter 200, and controls the maximum power point tracking converter 120, the bidirectional inverter 140, the systematic linker 160, and the bidirectional converter 200. In addition, in emergencies, the integrated controller 210 may operate a circuit breaker 155 that is installed between the load 150 and the systematic linker 160.

Figure 2A:
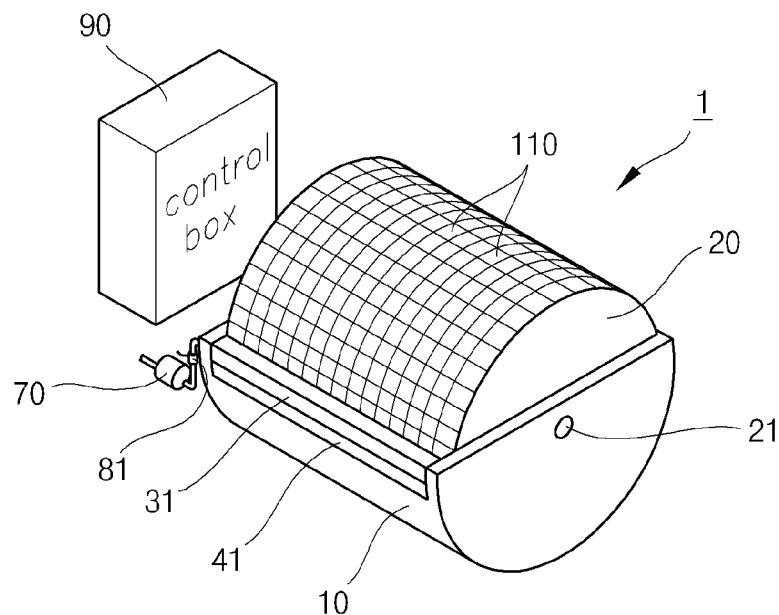
FIGS. 2A through 2C are a perspective view, a front view and a vertical cross-sectional view illustrating a solar cell cleaning device of an energy storage system according to an embodiment.
Figure 2B:
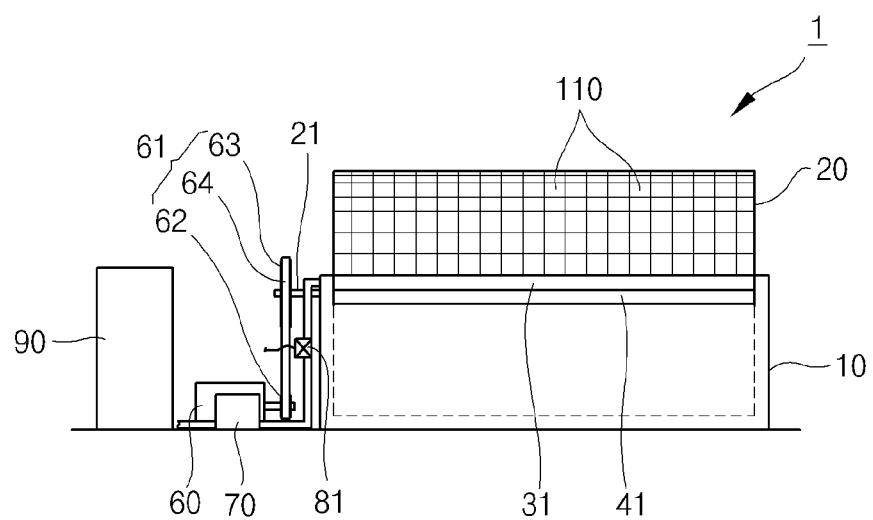
Figure 2C:
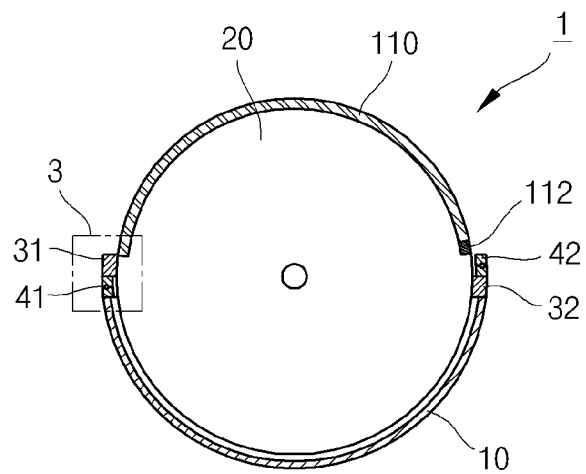

FIGS. 2A through 2C are a perspective view, a front view and a vertical cross-sectional view illustrating a solar cell cleaning device of an energy storage system according to an embodiment.

Referring to FIGS. 2A through 2C, a solar cell cleaning device 1 of an energy storage system includes a protective case 10, a drum 20, and brushes 31 and 32, and water injection nozzles 41 and 42. The solar cell cleaning device 1 further includes a sunlight sensor 112 installed on the drum 20 to sense the intensity of sunlight, an encoder 50 (refer to FIG. 4) sensing a rotation angle of the drum 20, a driving motor 60 and a connection mechanism 61 that are connected to the drum 20 to rotate the drum 20, a water supplying pump 70 supplying water to the water injection nozzles 41 and 42, and valves 81 and 82. Also, the solar cell cleaning device 1 further includes a control unit 90 that controls the driving motor 60, the water supplying pump 70, and the valves 81 and 82 on the basis of signals output from the sunlight sensor 112 and the encoder 50.

The protective case 10 may have an approximately semi-cylindrical shape with an upper portion being cut and removed and both ends being closed. The protective case 10 supports the drum 20. The brushes 31 and 32, and the water injection nozzles 41 and 42 are installed on the protective case 10. The protective case 10 has a semi-cylindrical shape in the drawings, but aspects of the present disclosure are not limited thereto, and the protective case can have other shapes. Although not shown, a discrete structure for supporting the protective case 10 may be provided. The protective case 10 may have a hole at its lower end to drain water.

The drum 20 has an approximately cylinder shape, and includes the solar cells 110 on its surface. However, the drum 20 can also have other shapes and forms which can be complementary or not to the protective case 10. The drum 20 is provided with a rotation shaft 21 that is coupled to the protective case 10. The solar cells 110 may be formed at least in a range from about 90° to about 180° along the surface of the drum 20. If the solar cells 110 are formed below about 90°, an area of the solar cells 110 versus an exposure area of the drum 20 is decreased. Thus, light collecting efficiency may be degraded. If the solar cells 110 are formed over about 180°, a part of the solar cells 110 are covered with the protective case 10. Thus, the area of the solar cells 110 is unnecessarily increased.

The brushes 31 and 32 are installed on the protective case 10, and are in close contact with the drum 20. In more detail, the brushes 31 and 32 may be referred to as a first brush and a second brush, respectively. The first brush 31 is installed along an end (the front side) of the protective case 10, that is, along the longitudinal direction of the drum 20. The second brush 32 is installed along another end (the rear side) of the protective case 10, that is, along the longitudinal direction of the drum 20. When the drum 20 is rotated, the brushes 31 and 32 are in close contact with the solar cells 110 to remove various contaminants from the solar cells 110. The brushes 31 and 32 may be formed of any one of synthetic fiber, synthetic resin, cotton, wool, rubber, and an equivalent thereof, which are adapted for removing dust or water, and which have excellent elasticity, but the aspects of the present disclosure are not limited thereto.

The water injection nozzles 41 and 42 are installed on the protective case 10, and slightly spaced apart from the drum 20 to efficiently inject water to the drum 20. In more detail, the water injection nozzles 41 and 42 may be referred to as a first water injection nozzle and a second water injection nozzle, respectively. The first water injection nozzle 41 is installed along an end (the front side) of the protective case 10, e.g., under the first brush 31. The second water injection nozzle 42 is installed along another end (the rear side) of the protective case 10, e.g., over the first brush 31. Accordingly, water is injected onto the surface of the solar cells 110 to be in close contact with the first and second brushes 31 and 32, thus improving cleaning efficiency of the solar cells 110.

The sunlight sensor 112 is installed on the drum 20 to sense the intensity of sunlight. Substantially, the sunlight sensor 112 may be installed between the solar cells 110. For example, the sunlight sensor 112 may be a light receiving device formed of cadmium sulfide. In this case, the sunlight sensor 112 continuously outputs a variable electric resistance value within a range from about 2 MΩ to about 200 MΩ according to the intensity of the sunlight.

The encoder 50 is substantially installed on the driving motor 60 to sense the rotation of the driving motor 60. Since the rotation of the driving motor 60 is related with the rotation angle of the drum 20, the encoder 50 senses the rotation angle of the drum 20. The encoder 50, installed on the driving motor 60, is not illustrated in FIG. 2A through 2C. As a matter of course, one of various sensors replacing the encoder 50 may be used to sense the rotation angle of the drum 20. For example, a limit switch, a laser sensor, or a photo sensor, which outputs an electric signal according to a rotation angle of the drum 20, may be installed on the protective case 10 to sense the rotation angle of the drum 20. Substantially, an aspect of the present disclosure is not limited to the aforementioned sensors including the encoder 50.

The driving motor 60 is connected to the drum 20 through the connection mechanism 61. For example, a driving pulley 62 may be installed on the driving motor 60, a driven pulley 63 may be installed on the rotation shaft 21 of the drum 20, and the driving pulley 62 may be connected to the driven pulley 63 through a belt 64, which constitute the connection mechanism 61 in the current embodiment. Instead of the connection mechanism 61, a chain member or gear member may be used. Furthermore, the drum 20 may be rotated by a single driving motor such as a geared motor, without using the connection mechanism 61.

The water supplying pump 70 is connected to the water injection nozzles 41 and 42 to supply water. The valves 81 and 82 may be referred to as a first vale and a second valve, respectively. The first vale 81 is installed between the first water injection nozzle 41 and the water supplying pump 70. The second vale 82 is installed between the second water injection nozzle 42 and the water supplying pump 70. For example, the valves 81 and 82 may be solenoid valves that are closed or opened by electric signals, but aspects of the present disclosure are not limited thereto.

The control unit 90, as described above, controls the driving motor 60, the water supplying pump 70, and the valves 81 and 82 according to signals output from the sunlight sensor 112 and the encoder 50.

When the amount of sunlight sensed by the sunlight sensor 112 is equal to or greater than a reference value, the solar cell cleaning device 1 configured as described above rotates the drum 20 along a preset angle to completely expose the solar cells 110 out of the protective case 10. As a matter of course, when the drum 20 is rotated, the surface of the solar cells 110 is cleaned by the first brush 31 and the first water injection nozzle 41.

That is, according to an embodiment, the solar cells 110 are exposed out of the protective case 10 only when sunlight is present. Thus, the solar cells 110 are protected from snow, rain, dew, dew condensation, and the other foreign substances.

In addition, according to the current embodiment, when the solar cells 110 are exposed out of the protective case 10, or when the solar cells 110 are stored in the protective case 10, the surface of the solar cells 110 is automatically cleaned, so as to prevent degradation in light collecting efficiency of the solar cells 110.

Figure 3:
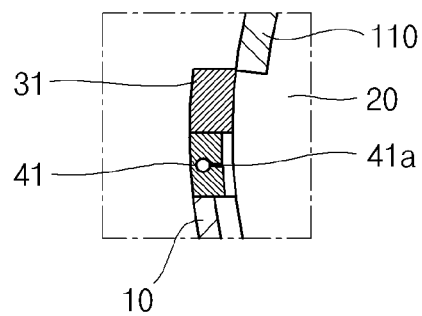
FIG. 3 is an enlarged view illustrating a region 3 of FIG. 2C.

FIG. 3 is an enlarged view illustrating a region 3 of FIG. 2C. Referring to FIG. 3, the first brush 31 is in close contact with the drum 20 or the solar cells 110 to remove various contaminants from the surface of the solar cells 110 when the drum 20 is rotated. The first water injection nozzle 41 is spaced apart from the drum 20 or the solar cells 110 to inject a sufficient amount of water to the solar cells 110. The first water injection nozzle 41 has an injection hole 41a that is oriented approximately to a rotation center of the drum 20, but that may be oriented downward. As such, before the solar cells 110 are cleaned by the first brush 31, the first water injection nozzle 41 injects a sufficient amount of water to the solar cells 110, so that the cleaning efficiency for the solar cells 110 can be further improved. In addition, the second water injection nozzle 42 may be configured in the same manner.

Figure 4:
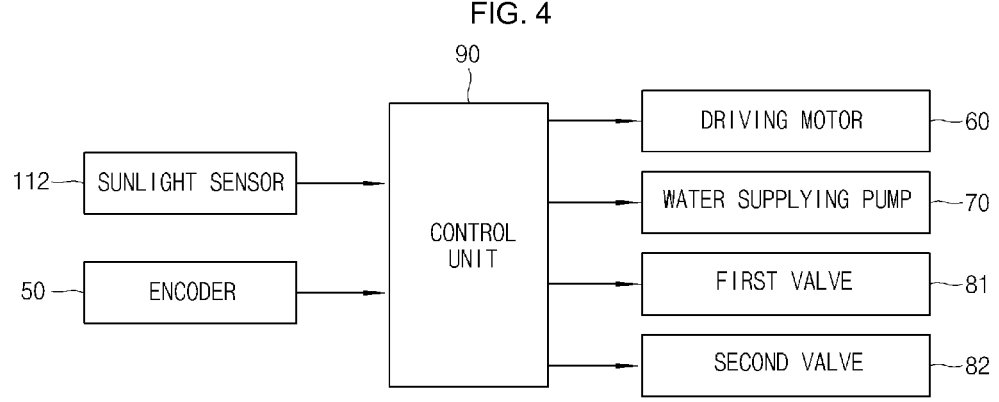
FIG. 4 is a block diagram illustrating an electric configuration of a solar cell cleaning device of an energy storage system according to an embodiment.

FIG. 4 is a block diagram illustrating an electric configuration of a solar cell cleaning device of an energy storage system according to an embodiment. Referring to FIG. 4, the sunlight sensor 112 senses and converts the intensity of sunlight into an electric signal, and transmits the electric signal to the control unit 90. The encoder 50 senses and converts a rotation angle of the driving motor 60, that is, a rotation angle of the drum 20, and transmits it to the control unit 90.

Then, the control unit 90 controls the driving motor 60, the water supplying pump 70, and the first and second valves 81 and 82 according to the intensity of the sunlight and the rotation angle of the drum 20.

The operation of the control unit 90 will be described later in detail.

Figure 5:
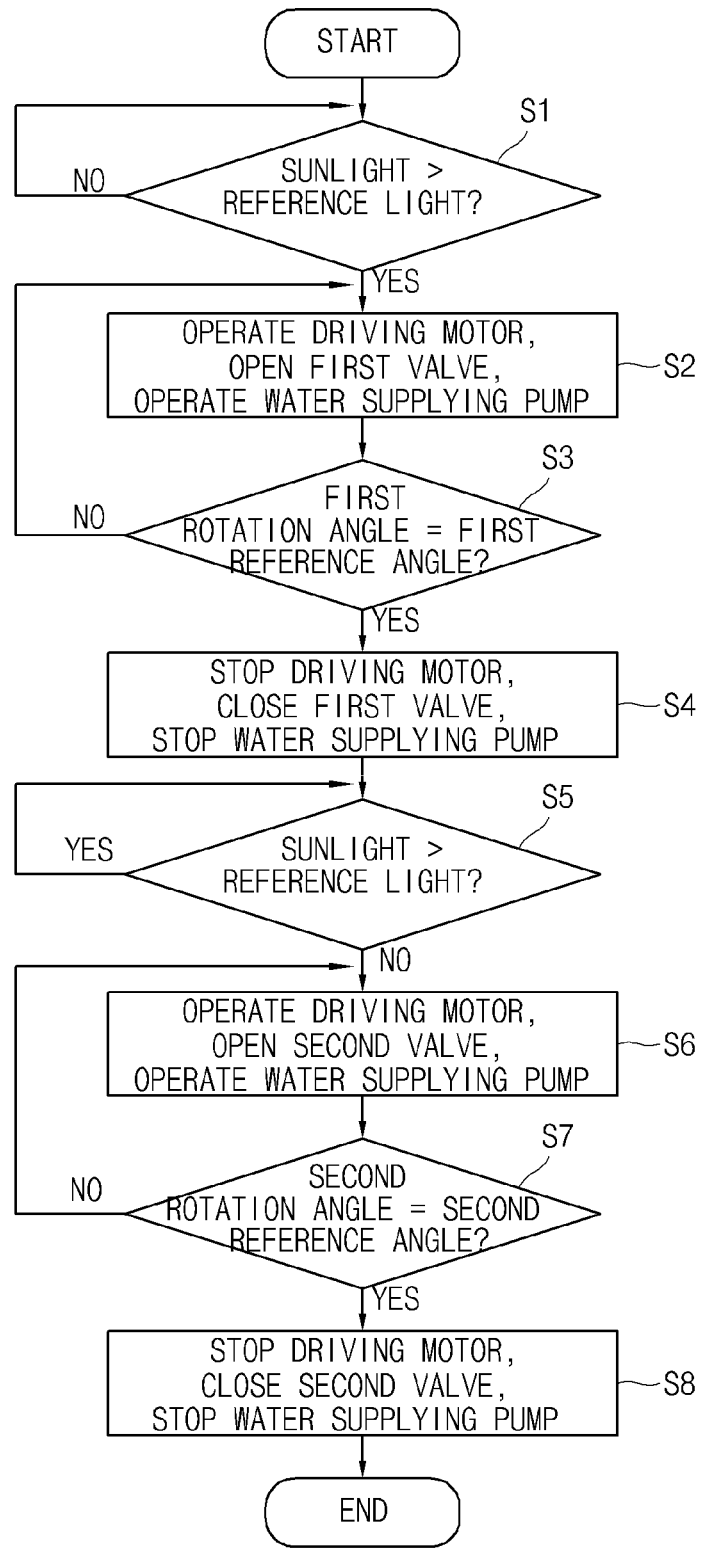
FIG. 5 is a flowchart illustrating a method of cleaning solar cells of an energy storage system according to an embodiment.

FIG. 5 is a flowchart illustrating a method of cleaning solar cells of an energy storage system according to an embodiment.

Referring to FIG. 5, the method of cleaning a solar cell includes eight operations, which will now be described with respect to the operation of the control unit 90.

Figure 6:
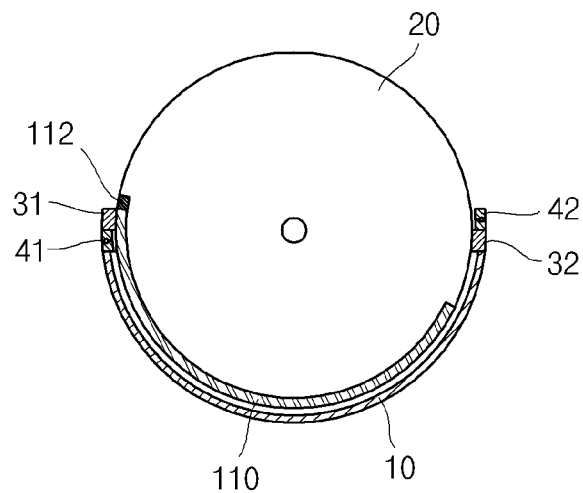
FIG. 6 is a cross-sectional view illustrating a state where the solar cells of FIG. 5 are stored in a protective case.

In operation S1, the control unit 90 uses the sunlight sensor 112 to determine whether the intensity of the sunlight is greater than that of the reference light. For example, referring to FIG. 6, a current intensity of sunlight is sensed using the sunlight sensor 112 installed on the drum 20 at a side of the solar cells 110. To this end, the rotation angle of the drum 20 is controlled to expose the sunlight sensor 112 out of the protective case 10 even when the solar cells 110 are stored in the protective case 10. That is, the control unit 90 controls the rotation angle of the drum 20 to expose the sunlight sensor 112 out of the protective case 10 at all times regardless of the position of the solar cells 100, that is, regardless of whether the solar cells 110 are exposed or not.

Figure 7A:
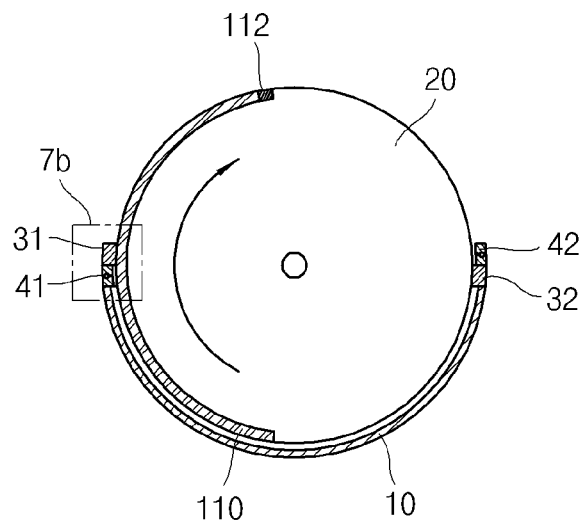
FIG. 7A is a cross-sectional view illustrating a state where the solar cells of FIG. 5 are exposed out of the protective case.
Figure 7B:
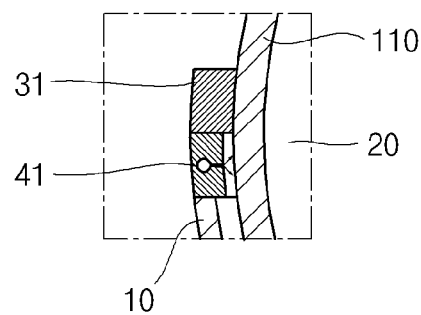
FIG. 7B is an enlarged view illustrating a region 7b of FIG. 7A.

In operation S2, when the intensity of the sensed sunlight using the sunlight sensor 112 is greater than that of the reference light, the control unit 90 operates the driving motor 60 to rotate the drum 20 provided with the solar cells 110 clockwise. That is, referring to FIG. 7A, the control unit 90 operates the driving motor 60 to rotate the drum 20 clockwise. In addition, referring to FIG. 7B, the control unit 90 operates the water supplying pump 70, and opens the first valve 81, so as to inject high pressure water to the surface of the solar cells 110 through the first water injection nozzle 41. At this point, since the first brush 31 is in close contact with the surface of the solar cells 110, the surface of the solar cells 110 is cleaned.

In operation S3, the control unit 90 uses the encoder 50 installed on the driving motor 60 to determine whether the rotation angle of the drum 20 is a first preset angle. The encoder 50 senses the rotation of the driving motor 60. However, since the rotation of the driving motor 60 is related with the rotation angle of the drum 20, the control unit 90 exactly perceives the rotation angle of the drum 20.

Figure 8:
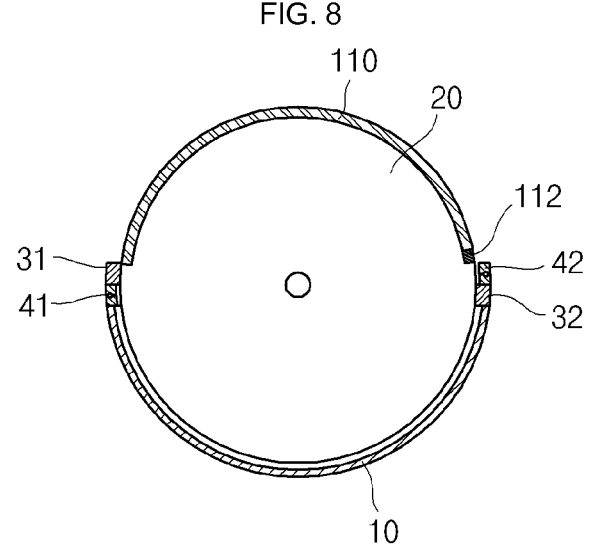
FIG. 8 is a cross-sectional view illustrating a state where the solar cells of FIG. 5 are completely exposed out of the protective case.

In operation S4, when the rotation angle of the drum 20 is the first preset angle, the control unit 90 stops the driving motor 60. That is, referring to FIG. 8, the rotation of the drum 20 is stopped before the sunlight sensor 112 is stored in the protective case 10. Accordingly, the sunlight sensor 112 can sense sunlight even when the solar cells 110 are exposed out of the protective case 10. In addition, the control unit 90 stops the water supplying pump 70, and closes the first valve 81, so as to stop the injection of water through the first water injection nozzle 41.

In operation S5, the control unit 90 uses the sunlight sensor 112 to determine whether the intensity of sunlight is greater than that of the reference light. For example, referring to FIG. 8, a current intensity of sunlight is sensed using the sunlight sensor 112 installed on the drum 20 at the side of the solar cells 110.

Figure 9A:
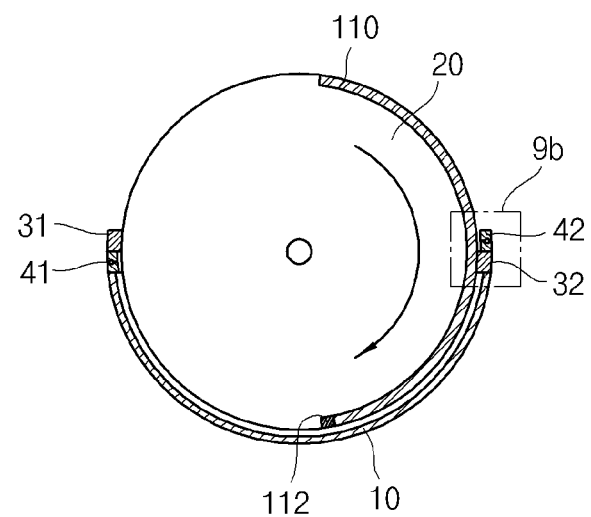
FIG. 9A is a cross-sectional view illustrating a state where the solar cells of FIG. 5 are stored in the protective case.
Figure 9B:
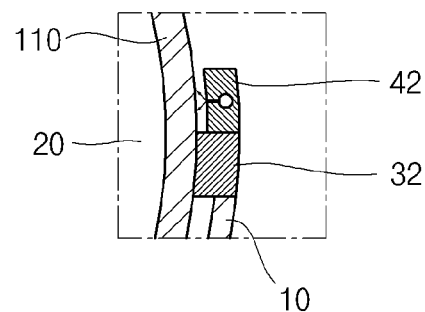
FIG. 9B is an enlarged view illustrating a region 9b of FIG. 9A.

In operation S6, when the intensity of the sunlight sensed using the sunlight sensor 112 is less than that of the reference light, the control unit 90 operates the driving motor 60 to rotate the drum 20 provided with the solar cells 110 clockwise. That is, referring to FIG. 9A, the control unit 90 operates the driving motor 60 to rotate the drum 20 clockwise. In addition, referring to FIG. 9B, the control unit 90 operates the water supplying pump 70, and opens the second valve 82, so as to inject high pressure water to the surface of the solar cells 110 through the second water injection nozzle 42. At this point, since the second brush 32 is in close contact with the surface of the solar cells 110, the surface of the solar cells 110 is cleaned.

In operation S7, the control unit 90 uses the encoder 50 installed on the driving motor 60 to determine whether the rotation angle of the drum 20 is a second preset angle. Thereafter, the encoder 50 senses the rotation of the driving motor 60. However, since the rotation of the driving motor 60 is related with the rotation angle of the drum 20, the control unit 90 exactly determines the rotation angle of the drum 20.

Figure 10:
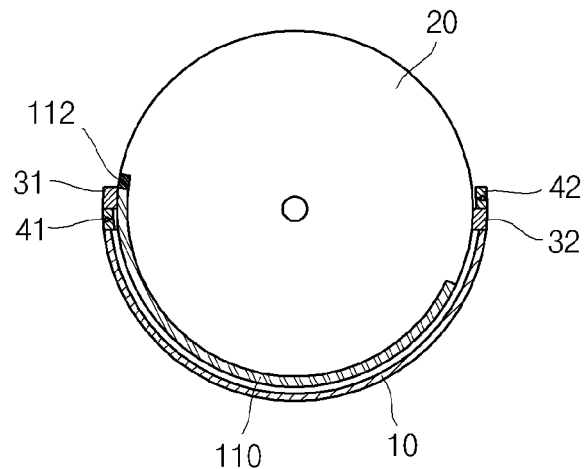
FIG. 10 is a cross-sectional view illustrating a state where the solar cells of FIG. 5 are completely stored in the protective case.

In operation S8, when the rotation angle of the drum 20 is the second preset angle, the control unit 90 stops the driving motor 60. That is, referring to FIG. 10, the rotation of the drum 20 is stopped just after the sunlight sensor 112 is exposed out of the protective case 10. Accordingly, the sunlight sensor 112 can sense sunlight regardless of whether the solar cells 110 are positioned outside of the protective case 10 or are stored in the protective case 10. In addition, the control unit 90 stops the water supplying pump 70, and closes the second valve 82, so as to stop the injection of water through the second water injection nozzle 42.

As described above, when the intensity of sunlight sensed by the sunlight sensor 112 is equal to or greater than that of the reference light, the drum 20 is rotated along the preset angle to position the solar cells 110 outside of the protective case 10. Additionally, when the drum 20 is rotated, the surface of the solar cells 110 is cleaned by the first brush 31 and the first water injection nozzle 41.

Furthermore, as described above, when the intensity of sunlight sensed by the sunlight sensor 112 is less than that of the reference light, the drum 20 is rotated along the preset angle to store the solar cells 110 in the protective case 10. Accordingly, when the drum 20 is rotated, the surface of the solar cells 110 is cleaned by the second brush 32 and the second water injection nozzle 42.

Figure 11A:
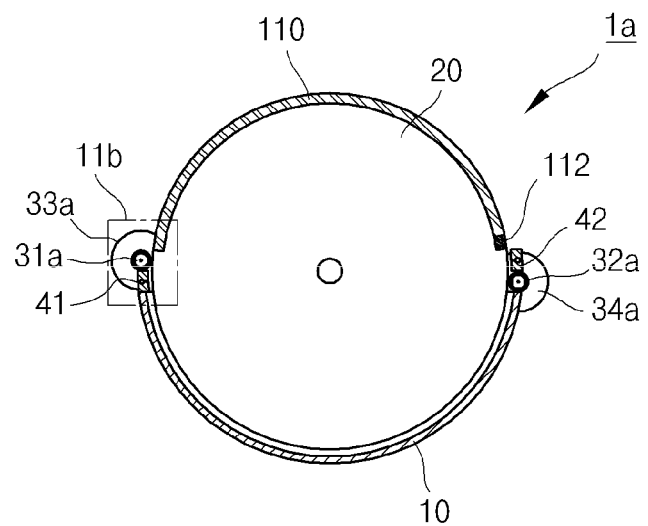
FIG. 11A is a cross-sectional view illustrating a solar cell cleaning device of an energy storage system according to an embodiment.
Figure 11B:
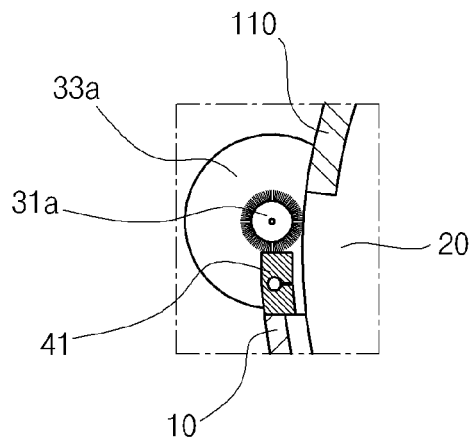
FIG. 11B is an enlarged view illustrating a region 11b of FIG. 11A.

FIG. 11A is a cross-sectional view illustrating a solar cell cleaning device of an energy storage system according to another embodiment. FIG. 11B is an enlarged view illustrating a region 11b of FIG. 11A.

Referring to FIGS. 11A and 11B, a solar cell cleaning device 1a according to another embodiment includes brushes 31a and 32a that may rotate in the rotation direction of the drum 20 or the opposite direction thereto. The brushes 31a and 32a are connected to motors 33a and 34b. Therefore, the brushes 31a and 32a rotate in a preset direction to further improve cleaning efficiency of the brushes 31a and 32a for the solar cells 110.

Figure 12:
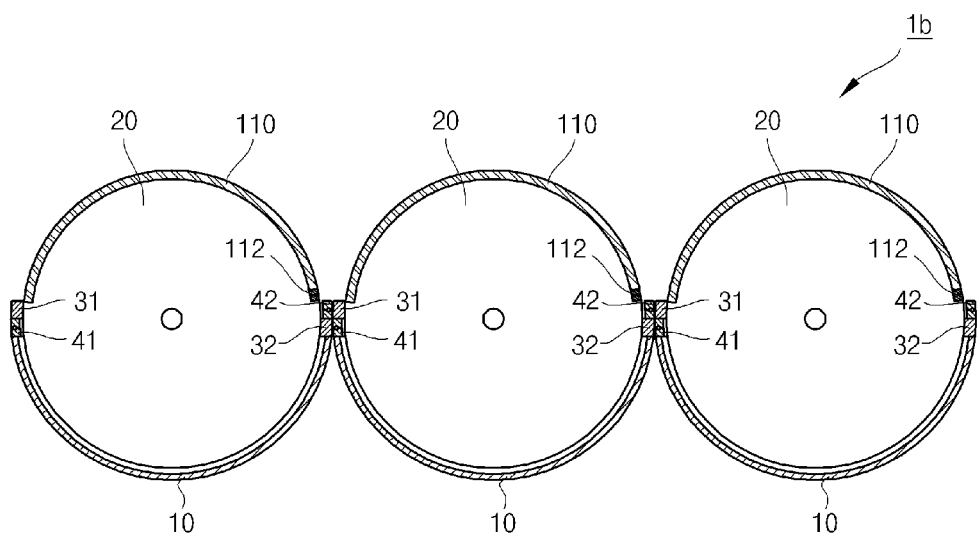
FIG. 12 is a cross-sectional view illustrating solar cell cleaning devices of an energy storage system according to an embodiment.

FIG. 12 is a cross-sectional view illustrating solar cell cleaning devices of an energy storage system according to another embodiment.

Referring to FIG. 12, a plurality of solar cell cleaning devices 1b according to another embodiment may be arrayed in a single line.

Thus, the solar cells 110 are efficiently arrayed through the solar cell cleaning devices 1b, and the cleaning efficiency are further improved.

Figure 13:
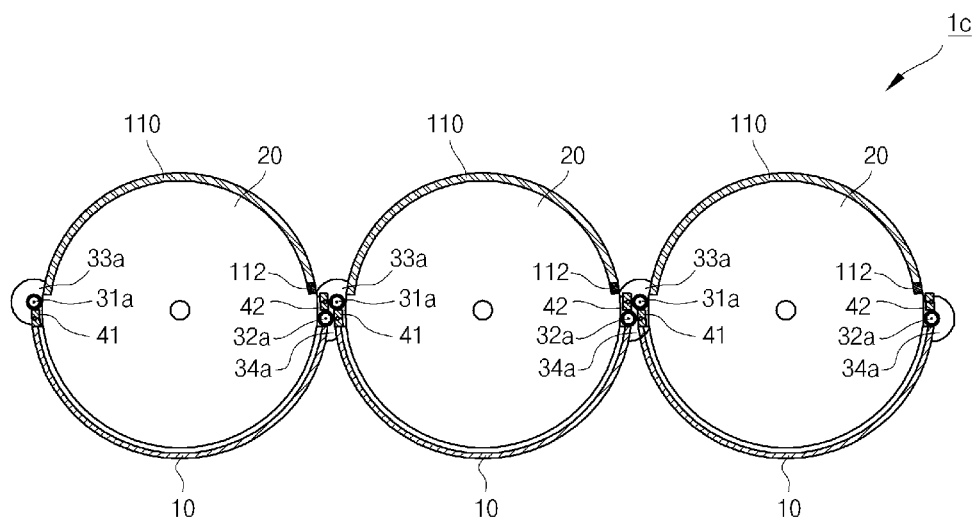
FIG. 13 is a cross-sectional view illustrating solar cell cleaning devices of an energy storage system according to another embodiment.

FIG. 13 is a cross-sectional view illustrating solar cell cleaning devices of an energy storage system according to another embodiment.

Referring to FIG. 13, a plurality of solar cell cleaning devices 1c according to another embodiment may be arrayed in a single line.

Thus, the solar cells 110 are efficiently arrayed through the solar cell cleaning devices 1c, and the cleaning efficiency are further improved.

As described above, the solar cells 110 are placed outside of the protective case 10 only when sunlight is present. Thus, the solar cells 110 are protected from snow, rain, dew, dew condensation, the other foreign substances.

In addition, when the solar cells are placed outside of the protective case, or when the solar cells are stored in the protective case, the surface of the solar cells is automatically cleaned, so as to prevent degradation in light collecting efficiency of the solar cells.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A solar energy generation and storage system having a plurality of solar cells, and a solar cell cleaning device comprising:
   a protective case;
   a rotatable drum onto which the plurality of solar cells are affixed, the drum rotatably coupled to the protective case such that in a storage position the plurality of solar cells are within the protective case; and
   a brushing device installed on the protective case near the drum,
   wherein the brushing device cleans the plurality of solar cells of the energy generation and storage system, when the drum is rotated wherein a sunlight sensor is installed on the drum such that it is capable of detecting sunlight when the drum is in the storage position, wherein when an intensity of sunlight sensed by the sunlight sensor is equal to or greater than a reference value, the drum is rotated along a preset angle to position the plurality of solar cells outside of the protective case, and when the intensity of sunlight sensed by the sunlight sensor is less than the reference value, the drum is rotated along the preset angle to store the plurality of solar cells in the protective case.

2. A method of cleaning a plurality of solar cells of an energy storage system, the method comprising:
   providing a drum having the plurality of solar cells mounted thereon;
   positioning the drum such that the plurality of solar cells are positioned within a protective case and a sunlight sensor is positioned on the drum outside the case;
   determining whether an intensity of sunlight is greater than an intensity of reference light;
   operating, when the intensity of the sunlight is greater than the intensity of the reference light, a driving motor to rotate the drum, so that the plurality of solar cells are positioned outside of the protective case, and the rotation of the drum cleans the plurality of solar cells by brushing them against a first brush mounted in the protective case;
   determining whether a rotation angle of the drum is a first preset angle; and
   stopping the driving motor when the rotation angle of the drum is the same as the first preset angle.

3. The method as claimed in claim 2, wherein the operating of the driving motor comprises operating a water supplying pump, and opening a first valve such that a first water injection nozzle injects water to the plurality of solar cell.

4. The method as claimed in claim 3, wherein the stopping of the driving motor comprises stopping the water supplying pump, and closing the first valve.

5. The method as claimed in claim 2, further comprising, after the stopping of the driving motor,
   determining whether an intensity of sunlight is greater than the intensity of the reference light;
   operating, when the intensity of the sunlight is less than the intensity of the reference light, the driving motor to rotate the drum on which the plurality of solar cells are installed, so that the plurality of solar cells are stored in the protective case, and the plurality of solar cells are cleaned by a second brush;
   determining whether a rotation angle of the drum is a second preset angle; and stopping the driving motor when the rotation angle of the drum is the second angle.

6. The method as claimed in claim 5, wherein the operating of the driving motor when the intensity of the sunlight is less than the intensity of the reference light comprises operating a water supplying pump, and opening a second valve such that a second water injection nozzle injects water to the plurality of solar cells.

7. The method as claimed in claim 6, wherein the stopping of the driving motor when the rotation angle of the drum is the second angle comprises stopping the water supplying pump, and closing the second valve.

8. A solar energy storage system comprising:
   a semi-cylindrical case;
   a drum coupled to end portions of the semi-cylindrical case and rotatable along a longitudinal axis of the semi-cylindrical case, the drum having a plurality of solar cells installed on a surface of the drum; such that the plurality of solar cells are positioned inside the semi-cylindrical case in a storage system;
   a cleaning device installed on outermost longitudinal edges of the semi-cylindrical case, wherein the cleaning device cleans the plurality of solar cells when the drum is rotated along the longitudinal axis of the semi-cylindrical case; and
   further comprising a sunlight sensor installed on the drum to sense an intensity of sunlight, when the drum is in the storage position wherein, when the intensity of the sensed sunlight is equal to or greater than a reference value, the drum is rotated along its longitudinal axis to a preset angle in order to move the plurality of solar cells installed on the surface of the drum outside of the semi-cylindrical case and expose the plurality of solar cells installed on the surface of the drum too the sunlight, and when the intensity of the sensed sunlight is less than the reference value, the drum is rotated along its longitudinal axis to the preset angle to the storage position to store the plurality of solar cells installed on the surface of the drum in the semi-cylindrical case.

* * * * *